United States Patent [19]

Kimura

[11] 4,051,704
[45] Oct. 4, 1977

[54] METHOD FOR THE MANUFACTURE OF AN ORNAMENTAL HEAD LUG OF THE SINGLE UNIT TYPE FOR USE IN BICYCLES

[76] Inventor: Senkichiro Kimura, 27-3, Higashi-Mukojima 4-chome, Sumida, Tokyo, Japan

[21] Appl. No.: 690,930

[22] Filed: May 28, 1976

[30] Foreign Application Priority Data

Nov. 19, 1975 Japan .................................. 50-138209
May 10, 1976 Japan ............................. 51-57656[U]

[51] Int. Cl.² ...................... B21D 39/08; B21D 22/10
[52] U.S. Cl. ..................................... 72/58; 29/421 R; 72/61
[58] Field of Search ................... 72/58, 59, 60, 61, 62; 29/421 R

[56] References Cited

U.S. PATENT DOCUMENTS

| 588,804 | 8/1897 | Porish | 72/61 |
|---|---|---|---|
| 2,203,868 | 6/1940 | Gray et al. | 72/58 |
| 2,375,763 | 5/1945 | Blais | 72/58 |
| 2,770,874 | 11/1956 | Lindow | 72/62 |
| 3,564,886 | 2/1971 | Nakamura | 72/62 |

Primary Examiner—Leon Gilden
Attorney, Agent, or Firm—Wenderoth, Lind & Ponack

[57] ABSTRACT

A tubular ferrous blank, the starting material of the invention, set in a sectional forming die having a concave inner surface corresponding to a desired contour is subjected to the oil hydraulic bulge forming process in a press machine provided with a vertically movable ram and a pair of horizontally opposed movable rams to form two identical, but different oriented protuberant components in one embodiment of the invention, and one relatively big protuberant component and relatively small twin parallel protuberant components in another embodiment, each of the components being axis-asymmetrically formed, and again subjected to a mechanical bulge forming step by the aid of two opposed mandrels affixed to the horizontal rams inserted forcibly into the thus formed tubular blank to form a cut wave joggled design or pattern on the exterior surface of the tubular blank.

9 Claims, 12 Drawing Figures

METHOD FOR THE MANUFACTURE OF AN ORNAMENTAL HEAD LUG OF THE SINGLE UNIT TYPE FOR USE IN BICYCLES

The present invention relates to the method and apparatus for the manufacture of an ornamental head lug of the single unit type with a cut wave pattern on the surface thereof for use in bicycle, more particularly to the bulge forming process by the use of the sectional dies in which a tubular ferrous blank is used as a starting material.

The ornamental head lug with the beautiful cut wave pattern for the bicycle of this invention has two protuberant sockets, an upper one for retaining an upper pipe of bicycle frame and a lower one for retaining a lower pipe of the same bicycle frame, and the length of the lug is in the range of 85 and 175 mm. More particularly, an ornamental head lug for the lady's sports bicycle has upper twin protuberant sockets for retaining upper twin pipes and a lower protuberant single socket for retaining a lower pipe of the same bicycle frame.

Two processes for the manufacture of the head lug have been heretofore known:

1. Process for the production of a finished head lug by assembling and welding three parts, a main tubular body prepared as having a desired cut wave pattern on the surface thereof, an upper pipe socket, and a lower pipe socket formed by cutting sheet material to size and making it round.
2. Process for the manufacture of a finished head lug by cutting a sheet material to size to cover the whole body including two protuberant pipe sockets, making it round, and at the same time, subjecting a semi-formed article to the joggle die press work so as to form a joggled cut wave pattern on the surface thereof, and finally welding the whole seam.

Several manufacturing steps as well as labor hours are required in the above two processes which are different from this invention in the bulge forming of a one-piece head lug from a tubular ferrous blank while the latter is adapted for mass production on a cheap cost basis.

The oil hydraulic forming process to expand axis-asymmetric components from the tubular stock by inserting it into a sectional die consisting of top half and bottom half, introducing a high pressure oil into the tubular blank in the die, and applying equal pressures to both ends of the blank is disclosed in Japan Pat. Nos. 417,728 and 417,730 (both filed Oct. 3, 1961; published Sept. 5, 1963); and 418,055 (filed Oct. 3, 1961; published Sept. 20, 1963) (See "Industrie Anzeiger", 88, 770, 1001).

Japan Pat. No. 417,728 discloses the provision of means for eliminating a repulsive force resulting from the high pressure oil within the tubular stock and which pushes back the horizontal pistons applied to both ends of the tube.

However, it has been found that the above means for eliminating the repulsive force is no longer required in the present invention. Furthermore Japan Pat. No. 418,055 teaches us the method of providing an oil seal between the ends of the tube and the piston rods by making a serrated shoulder on the piston end, but it has also been found that the serrated shoulder tends to be broken by the severe frequent operation of the machine. Thus the maintenance of the serrated shoulder on the piston end is so difficult that the inventor has discontinued to form it, but it has proved unexpectedly that no trouble happens except the leakage of a trifling amount of oil.

As a result, I have been able to dispense with the need of making the serrated shoulder in order to attain a tight oil seal in this invention, which contributes effectively towards the decrease of the overall production cost.

In summary, in accordance with one embodiment of the invention, the present invention comprises inserting a tubular ferrous blank into a first sectional die on the bed of the oil hydraulic bulge forming press machine provided with a vertically reciprocating hydraulic ram suspended from the crown of the single unit arcuated frame thereof, and a pair of horizontally opposed hydraulic rams to bulge-form a single protuberant component on the blank, then charging the thus formed semi-product into a second sectional die on the same machine to bulge-form two or twin parallel small protuberant components spaced from the single component on the same blank, then again charging the thus formed semi-product into a third sectional die on the bed of the same machine, and forcing a pair of mandrels into both ends of the semi-product to bulge-form a desired joggled cut wave pattern on the exterior surface thereof instead of the high pressure oil.

Another embodiment of the invention comprises inserting the ferrous tubular stock into a first sectional die of the same press machine to bulge-form axis-asymmetric two protuberant components of the stock, then charging the thus formed semi-product into the third sectional die, and forcing a pair of mandrels into both ends of the product to bulge-form a desired joggled cut wave pattern on the exterior surface thereof instead of the high pressure oil.

An object of the invention is to provide an improved method for the manufacture of an ornamental head lug for bicycles by the application of a novel oil hydraulic bulge forming process, whereby the speed of manufacturing process can be exceedingly accelerated.

Another object of the invention is to provide an improved method for the manufacture of an ornamental head lug for bicycles, whereby a considerable reduction of manufacturing cost in the order of about 40% compared with the present similar available product can by accomplished by the introduction of mass production system including an automatic production means.

A further object of the invention is to provide an improved ornamental head lug for bicycles with beautiful and appealing appearance as well as excellent strength and durability.

A further object of the invention is to provide an improved method and apparatus for carrying out the principles of the invention.

The invention will be more fully described in reference to the accompanying drawing, in which.

Figure 1:
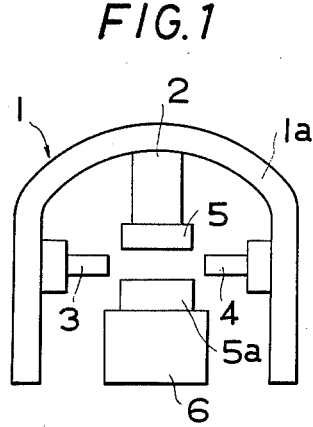
FIG. 1 is a schematic view of the oil hydraulic bulge forming press machine of this invention.

In FIG. 1, the bulge forming press 1 of this invention comprises a single unit arch frame 1a, a vertically reciprocating ram 2 suspended from its crown, and a pair of horizontally reciprocating opposed rams 3, 4 at both sides thereof, respectively. The first sectional die 5, 5a is situated immediately under the vertically reciprocating ram 2 and between the pair of horizontally reciprocating opposed rams 3, 4, and the bottom half 5a of the die is bolted onto the bed 6 while the top half 5 thereof is secured to the vertical ram 2. A pair of pistons 14, 14a are secured to the pair of horizontal opposed rams 3, 4 so that each of the pistons can perform a compressive action to each end of the tubular blank 7 in the sectional die. The rams are hydraulically driven in a known manner.

Figure 2:
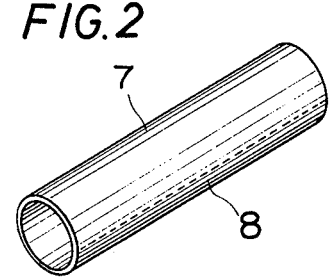
FIG. 2 is a view of a longitudinally welded steel pipe as a starting material including a longitudinal welded seam.

In FIG. 2, a welded pipe blank 7 has a welded seam 8 in a dotted line.

In reference to the welding method of the welded steel pipe blank used in this invention, any welding, such as, electric resistance welding, forge welding, gas welding, and arc welding may be adopted, but spiral seam welding is not suitable. In charging the welded pipe blank into the first sectional die 5, 5a, attention should be paid that the welded seam 8 is located outside the area where a single or plural components are to be bulge-formed.

On the other hand, such a seamless pipe as the one produced by Mannesmann or Stiefel process may be used as a tubular blank, and in charging it into the die, there is an advantage that no attention may be paid to the welded seam so that the seamless pipe may be automatically charged while there is a disadvantage due to a higher cost than that of the welded pipe.

In this invention, the above tubular ferrous stock as a starting material is a longitudinally welded pipe available in the market, the steel of which contains 0.12%C, 0.35%Si, 0.25 – 0.60%Mn, 0.040%P, and 0.040%S maximum, respectively, and the remainder Fe; its properties, tensile strength 32 – 42 Kg/mm.$^2$, elongation 30 – 40%, and Brinell hardness 80 – 120. Its length is 135 – 230 mm., outer diameter 34 – 38 mm., and thickness 1.9 – 2.3 mm.

In consideration of the tubular ferrous stock, the sectional die, the combined whole pressure applied thereto, and the semiproduct thus produced by the hydraulic bulge forming press machine altogether in all, it seems that the teachings disclosed in the above Japan Pat. Nos. 417,728 and 418,055 in connection with the means for eliminating the repulsive force and the oil seal means between the tube end and the piston rod by making the serrated shoulder on the piston end could be neglected in the performance of the present invention.

The size of the finished head lug manufactured from the welded pipe blank of the above size by this invention is as follows; about 10 sizes in the range of 85 – 175 mm. in length, its main bore 29.8 – 30mm., and its thickness 2.1 – 2.4 mm. The main bore 29.8 mm. is an only difinite one in all sizes.

The pipe blank 7 is treated by the Bonderite process to coat the Bonderite film thereon before it is subsequently worked. It has been found that no other coating than the Bonderite film is necessary, because it works as a good lubricant for bulge forming and subsequent working.

The pipe blank 7 coated with the Bonderite film is then inserted into the first sectional die 5, 5a(FIG. 3), and attention must be paid that the seam 8 is put outside the area where the protuberant component is to be bulge-formed. The thus formed product is to be an ornamental head lug for the bicycle, therefore the seam 8 must be located outside the front face of the head lug. If the front face thereof has no seam at all, it will bring forth a much more beautiful effect by polishing.

Figure 3:
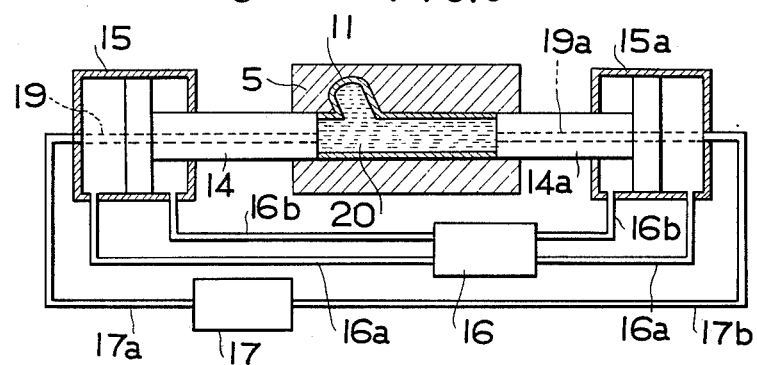
FIG. 3 is a schematic view of a first sectional die in which the pipe blank is inserted and subjected to the hydraulic bulge forming step.

In reference to the sectional die shown in FIG. 3, it consists of the top half 5 and the bottom half 5a, the latter half 5a is bolted onto the bed 6 of the press machine 1 as shown in FIG. 1.

Referring more particularly to FIG. 3, at first a hydraulic oil 20 with no pressure is introduced from an oil supply pump 17 through the line 17a and the central bores 19, 19a of the pistons 14, 14a, respectively, and then into the tubular blank 7 set in the die 5, 5a. When both ends of the blank 7 are in tight contact with the pistons, the oil pressure is increased by transferring the pump from the oil supply one 17 to the high pressure one 16 to attain a desired value in the range of 950 – 1200 Kg./cm.$^2$, more particularly, 850 – 900 Kg./sq.cm. in accordance with the first embodiment of the invention.

The capacity of the vertical ram 2 now in operation is in the range of 120 – 360t. while that of the horizontal rams in the range of 60 – 180t., respectively. For example, when one die is applied, the force of vertical ram is 120t. while horizontal rams, 60t., respectively; when six dies are applied, the vertical ram 360t. while the horizontal rams 180t., respectively.

Thus, the tubular blank 7 set in the first die is subjected to the combined load as follows: 120 – 360t. applied vertically from the above, the inner oil pressure 950 – 1200 Kg./cm.$^2$, and 60 – 180t applied horizontally from both sides, respectively. Then the oil hydraulic bulge forming process works to bulge form axis-asymmetric one protuberant component in accordance with the preformed inner recess shape of the first die. In this example, one component 11 is shown, but two axis-symmetric components will do, which is described hereinafter.

The outer diameter of pipe blank now in use for my purpose is 34 – 38 mm. and its thickness 1.9 – 2.3 mm. When the blank of this size is bulge formed, the size of the component 11 is as follows: outer diameter 28.0 – 31 mm., the length of one component to the pipe axis is 1 – 1.4 times as big as the outer diameter, and the amount of compression, in other words, the difference of length between the original length of pipe blank and the length of the bulgeformed primary product, 50 – 55 mm.

The time required for the bulge forming process of this invention is so exceedingly short that the period of time from charging the blank into the die to the finish of forming is only 15 seconds.

In the manufacture of the head lug for bicycle from the tubular blank in this invention, I have described hereinbefore that both method of eliminating repulsion and the oil seal means by forming a serrated shoulder on the piston end are no longer necessary.

The hydraulic oil now in use is an engine oil with the flash point 220° C. available in the market, and cooling means for the oil is so provided that the burning of oil during the high pressure operation thereof will not happen.

In this example the protuberant component is shown as slanting to the pipe axis, but the angle of incline now I make for the head lug is in the range of 58° – 115° including the right angle to the pipe axis.

Figure 4:
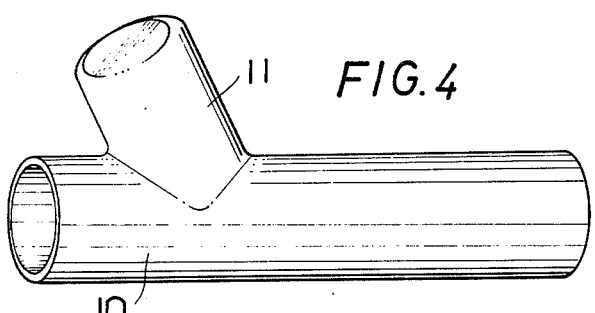
FIG. 4 is a view of a primary product with one protuberant component bulge-formed in the bulge forming step.
Figure 5:
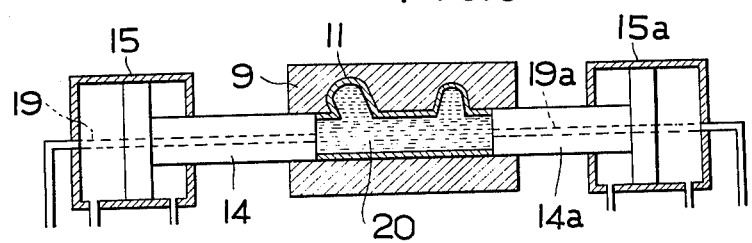
FIG. 5 is a schematic view of a second sectional die in which the primary product of FIG. 4 is inserted and subjected to the oil hydraulic bulge forming step to form twin parallel protuberant components in the bulge forming process.
Figure 6:
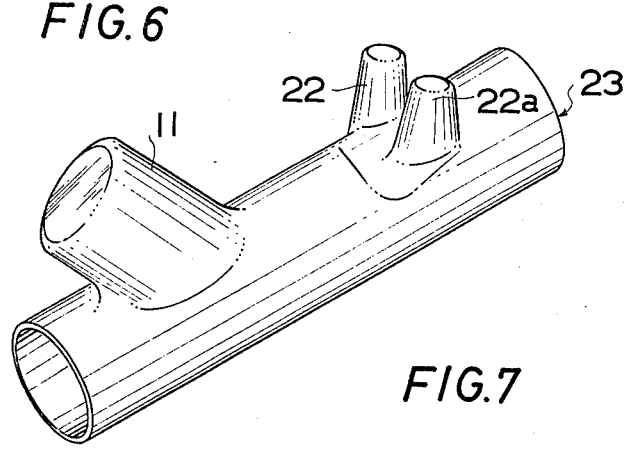
FIG. 6 is a view of a secondary product with one protuberant component and twin parallel protuberant components.

A hollow semi-product 10 with one protuberant component 11 of FIG. 4 is charged into the second sectional die 9 shown in FIG. 5, the details of operation of which are omitted, because they are almost the same as the die 5 illustrated in FIG. 3, except the provision of twin parallel protuberant components as indicated in FIG. 6. The parallel direction of the twin components are located perpendicularly to the pipe axis on the surface of the tubular semi-product 10. In reference to the die 9 in FIG. 5, this digrammatic view shows its section along the center line of one of the twin components by shifting to either side of the die 9.

The second bulge forming process to form twin parallel components on the semi-product 10 with a single protuberant component (FIG. 4) in the second sectional die 9 in connection with FIG. 5 is almost the same as the first bulge forming process shown in FIG. 3, but the oil hydraulic pressure is different. The oil pressure at the second bulge forming process is in the range of 1050 – 1100 kg./sq.cm., which is higher than the oil pressure at the first bulge forming process, 850 – 900 kg./sq.cm.

Thus, I have discovered that to bulge form two small parallel protuberant components requires a higher hydraulic pressure than the pressure which requires to bulge form a single relatively big protuberant component.

Figure 7:
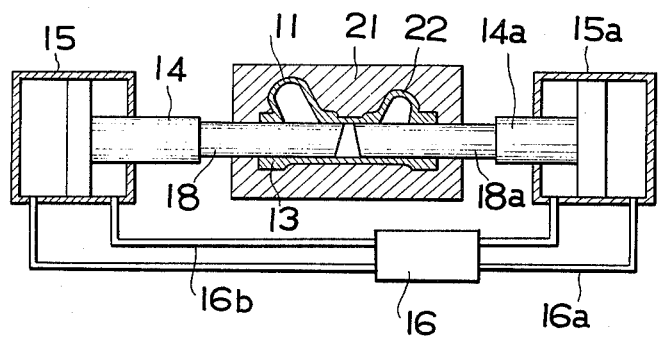
FIG. 7 is a schematic view of a third sectional die in which the secondary product of FIG. 5 is inserted and subjected to the mechanical bulge forming step by a pair of mandrels, not by the oil pressure.
Figure 8:
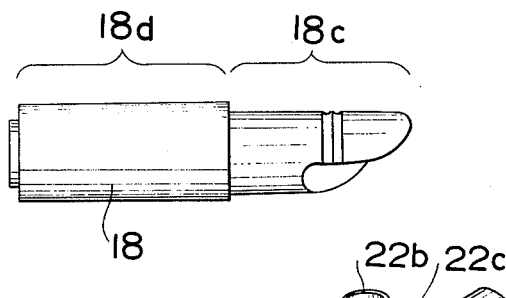
FIG. 8 is a side view of a mandrel for use in mechanical bulge forming.
Figure 9:
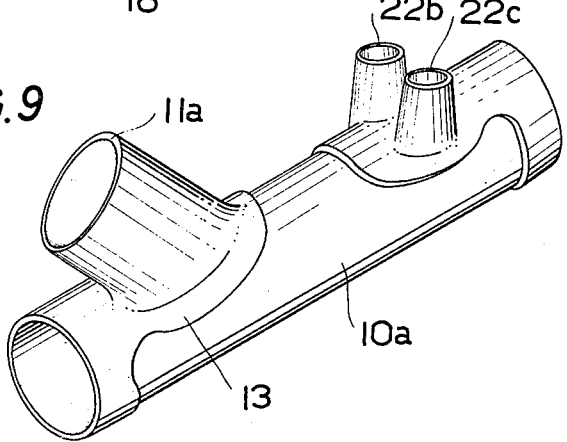
FIG. 9 is a view of a finished head lug produced from the step of FIG. 7 showing an ornamental joggled or stepped cut wave pattern on the external surface of the head lug, and finally the closed top ends of one component and twin ones are opened to form pipe sockets.

Thus formed hollow semi-product 23 with a single relatively big protuberant component 11 and twin parallel relatively small protuberant components 22, 22a in FIG. 6 is charged into a third sectional die 21 as shown in FIG. 7, and at the same time, a pair of mandrels 18, 18a with a bigger outer diameter than the bore of the product 10 in the order of 1.5 – 2.5 mm. are mechanically forced into each end of the hollow product 10 by the aid of the pistons 14, 14a affixed to the horizontal opposed rams 3, 4 in order to bulgeform an ornamental cut wave pattern 13 shown in FIG. 9 on the exterior surface thereof. In accordance with one embodiment of the invention, a mandrel 18 is shown in FIG. 8, though it is not to be limited, which consists of two portions, a shank 18d and a working end 18c. The mandrel 18 is made of a hard alloy steel.

The bore of the semi-product 10 is in the range of 27 – 28 mm., and the outer diameter of the working end 18c of the mandrel 18 is 29.5 mm. The length of the working end 18c is shorter than the half of the product 10. The bore of the finished head lug with the cut wave pattern is in the range of 29 – 30 mm., which is one of the universally adopted standard measurement.

It is to be noted that the bulge forming process to make the ornamental cut wave pattern 13 on the surface of the hollow product is not hydraulically performed, but mechanically by the aid of the mandrel forcedly inserted thereinto. The thickness of the joggled cut wave pattern is about 1 mm.; in other words, the difference of thickness between the cut wave pattern area and the remaining surface area is about 1 mm.

It is seen that the mandrel can be inserted into the hollow product with a revolving action, that is, a revolving mandrel can insert thereinto much more easily with a less power.

The capacity of the bulge forming press machine of FIG. 7 is the vertical ram 120t. and the horizontal rams 60t., respectively, wherein two sets of the third sectional die can be operated at the same time. It is understood that the top half of the third die is secured to the vertical ram 2 and the bottom half is bolted onto the bed of the press. The third sectional die 21 shown in FIG. 7 has a concave or indented area 13 to the depth or recess of about 1 mm. so designed that there happens the metal flow into the concave area due to the pressing action of the mandrel when forced into the hollow product. Thus the outer surface of the hollow product expands to the thickness of about 1 mm. at the area where the working end of the mandrel impacts.

On the other hand, however, an experimental work was conducted wherein a coining or stamping die with the cut wave pattern was pressed onto the outer surface of the hollow product supported with the mandrel inserted thereinto in order to joggle-form the desired cut wave pattern thereon, but it has been found that it was a failure. However, the reason therefor is omitted.

A product thus bulge formed with the wave pattern has one and twin protuberant components with the closed top ends, which are drilled at first with a little hole, 9 – 12 mm. diameter, and then subjected to the burring step by means of a punching die to make a desired open mouth of socket. Finally, the interior of the hollow product is finished by machining to size to manufacture a completed head lug with a cut wave pattern shown in FIG. 9.

The above product formed with the cut wave pattern, one big protuberant component, and twin parallel small protuberant components is used for a lady's sports bicycle, and twin parallel sockets are for retaining two parallel upper pipes of the pipe frame for lady sports bicycle, and the single socket for the lower pipe of the pipe frame for bicycle.

In one embodiment of the invention, the size of each of the twin components is as follows: the height from its top to the exterior surface of the head lug, 8 – 14 mm., the inside diameter, 12.5mm., and the outer diameter, 14.5 mm.; and the size of the single big component is: the outer diameter 28.0 – 31 mm., the height from its top to the pipe center axis, 1.4 times as big as the outer diameter, and the amount of compression, in other words, the difference of length between the original length of pipe blank and the length of the bulge-formed product. It is understood that the above sizes are not to be limited.

Figure 10:
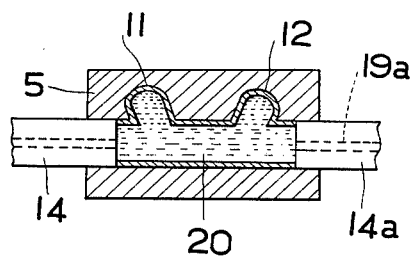
FIG. 10 is a view similar to FIG. 3, but a first sectional die of this figure is provided with two identical, but different oriented protuberant components in accordance with another embodiment of the invention.
Figure 11:
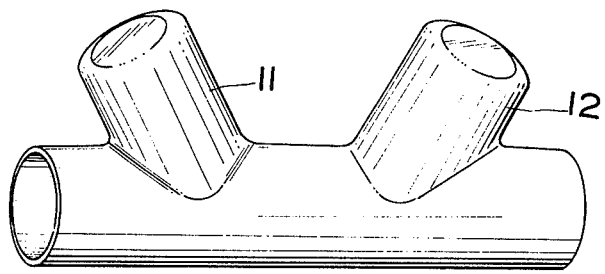
FIG. 11 is a view of a primary product with two protuberant components bulge formed by the step of FIG. 10.
Figure 12:
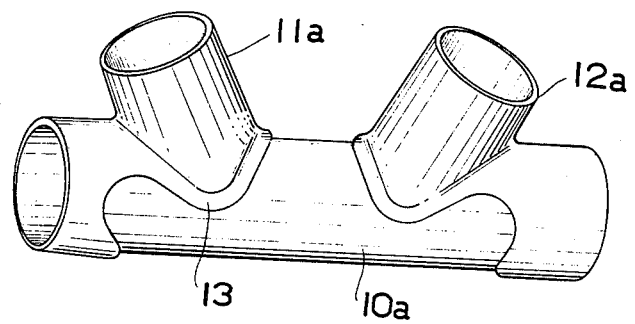
FIG. 12 is a view of a finished head lug produced from the primary product of FIG. 11 showing an ornamental joggled cut wave pattern bulge formed by the step of FIG. 7 and the closed top ends of two components are opened to form pipe sockets.

The second embodiment of the invention in connection with FIGS. 10 – 12 is described hereinbelow. The second embodiment is directed to the manufacture of a head lug with two indentical axis-asymmetric different oriented protuberant components which are to be sockets for retaining an upper pipe and a lower one of the pipe frame of a bicycle, respectively, by the same bulge forming process in accordance with the principle of the present invention. FIG. 10 shows a schematic view of a first sectional die in which a pipe blank is inserted and subjected to the oil hydraulic bulge forming step, which is almost similar to the process described hereinbefore in connection with FIG. 3. In the bulge forming process for making two identical, but different oriented components on the pipe blank, the pipe blank is subjected to the bulge forming step at one time only with an oil hydraulic pressure in the range of 950 – 1200 kg./sq.cm. FIG. 10 omits the same hydraulic system as shown and described in FIG. 3, but both the operation of the system and the bulge forming process are completely the same as described hereinbefore.

In reference to the sizes and dimensions of pipe blank, finished product manufactured therefrom, and the single protuberant component in connection with FIGS. 10 – 12, they are almost the same as described hereinbefore.

A semi-product of FIG. 11 with two different oriented protuberant components 11 and 12 is inserted into the third sectional die 21 shown in FIG. 7 and subjected to the mechanical bulge forming step by the aid of the pair of mandrels 18 and 18a in order to bulge-form a cut wave pattern 13 on the exterior surface of the semi-product to obtain a finished head lug of FIG. 12.

The details of the mechanical bulge forming process described above are almost the same as those mentioned in FIG. 7, therefore omitted for brevity.

While specific embodiments of the invention have been shown and described in detail to indicate the application of the principles of the invention, it will be understood that the invention may be embodied otherwise without departing from such principles.

I claim:

1. Method for the manufacture of an ornamental head lug with a cut wave pattern of the single unit type for use in bicycles from a tubular ferrous blank as a starting material by an oil hydraulic bulge forming press machine in which there are provided with a first sectional die, a second sectional die, a third sectional die, a vertically reciprocating hydraulic ram, and two horizontally opposed and reciprocating rams, the bottom half of each of said sectional die is bolted onto the bed of said press machine and the top half thereof is lowered and held in position by said vertically reciprocating ram, all of said rams are driven by the oil hydraulic pressure, the improvement which comprises inserting said tubular ferrous blank into said first sectional die designed to bulge-form a single protuberant component on said blank, subjecting said blank in said first die to the combined load of a vertical compressive load of said vertical ram, an axial compressive load applied to both ends of said blank through pistons by said horizontal rams, and a high pressure oil supplied into the interior of said blank, inserting the thus bulge formed tubular blank with one protuberant component into said second sectional die designed to form two or twin parallel small protuberant components on the exterior surface of said bulge-formed blank, the parallel direction of said twin components being located perpendicularly to the axis of said tubular blank, subjecting said primary semiproduct in said sectional die to said combined bulge forming pressure to obtain a secondary product with one and twin protuberant components on said tubular blank, inserting said secondary product into a third sectional die designed to form a ornamental joggled cut wave pattern on the exterior surface of said secondary product, mechanically forcing a pair of horizontally opposed mandrels into each end of said secondary product in said third sectional die, and forming said pattern on said surface, the outer diameter of said mandrel being bigger than the bore of said secondary product by the order of 1.5 – 2.5 mm., whereby means for eliminating repulsion resulting from the high pressure oil in said tubular blank in said first and second dies and an oil seal means by the serrated shoulder on said piston are not provided.

2. Method according to claim 1, in which said tubular ferrous blank is a steel pipe 135 – 230 mm. in length, 34 – 38 mm. outer diameter, and 1.9 – 2.3 mm. thick, the analysis thereof is 0.12%, 0.35%Si, 0.25 – 0.60%Mn, 0.040%P, and 0.040%S maximum, respectively, and the remainder Fe, and the property thereof is tensile strength 32 – 42 Kg./mm.$^2$ and elongation 30 – 40%.

3. Method according to claim 1, in which the size of one protuberant component: the outer diameter thereof 28.0 – 31 mm., the length thereof from its top to said pipe axis 1 – 1.4 times as big as the outer diameter of said tubular blank, and the amount of compression, in other words, the difference of length between the original length of pipe blank and the length of the bulge-formed primary product, 50 – 55 mm.; and the angle of incline of said protuberant component to the axis of said tubular blank in the range of 58 – 115.

4. Method according to claim 1, in which the size of each of said twin protuberant components is: the height or length from its top to the exterior surface of the head lug, 8 – 14 mm., the inside diameter, 12.5 mm., and the outer diameter if 14.5 mm.

5. Method according to claim 1, in which said mandrel consists of the shank portion and the working end portion the outer diameter of which being bigger than the bore of the head lug in the order of 1.5 – 2.5 mm.

6. Method for the manufacture of an ornamental head lug with a cut wave pattern of the single unit type for use in bicycles from a tubular ferrous blank as a starting material by an oil hydraulic bulge forming press machine in which there are provided with a first sectional die, a second sectional die, a vertically reciprocating hydraulic ram, and two horizontally opposed and reciprocating rams, the bottom half of each of said sectional die is bolted onto the bed of said press machine and the top half thereof is lowered and held in position by said vertically reciprocating ram, all of said rams are driven by the oil hydraulic pressure, the improvement which comprises inserting said tubular ferrous blank into said first sectional die designed to bulge-form two axis-asymmetric protuberant components on said blank, subjecting said blank in said first die to the combined load of a vertical compressive load of said vertical ram, an axial compressive load applied to both ends of said blank through pistons by said horizontal rams, and a high pressure oil supplied into the interior of said blank, inserting the thus bulge-formed tubular blank with two protuberant components into said second sectional die designed to form an ornamental joggled cut wave pattern on the exterior surface of said bulge-formed blank, mechanically forcing a pair of horizontally opposed mandrels into each end of said bulge-formed blank, and bulge forming said cut wave pattern on said bulge-formed blank, the outer diameter of said mandrel being bigger than the bore of said bulge-formed blank by the order of 1.5 – 2.5 mm., whereby means for eliminating repulsion resulting from the high pressure oil in said tubular blank in said first die and an oil seal means by the serrated shoulder on said piston are not provided.

7. Method according to claim 6, in which said tubular ferrous blank is a steel pipe 135–230 mm. in length, 34–38 mm. outer diameter, and 1.9–2.3 mm. thick, the analysis thereof is 0.12%C, 0.25–0.60%Mn, 0.040%P, and 0.040%S maximum, respectively, and the remainder Fe, and the property thereof is tensile strength 32 – 42 Kg/mm.$^2$ and elongation 30 – 40%.

8. Method according to claim 6, in which the size of one protuberant component: the outer diameter thereof 28.0 – 31 mm., the length thereof from its top to said pipe axis 1 – 1.4 times as big as the outer diameter of said tubular blank, and the amount of compression, in other words, the difference of length between the original length of pipe blank and the length of the bulge-formed primary product, 50 – 55 mm.; and the angle of incline of said protuberant component to the axis of said tubular blank in the range of 58 – 115.

9. Method according to claim 6, in which said mandrel consists of the shank portion and the working end portion the outer diameter of which being bigger than the bore of the head lug in the order of 1.5 – 2.5 mm.

* * * * *